M. COOKE & J. W. WATT.
Filters.
No. 132,385.                                   Patented Oct. 22, 1872.
Fig. 1.
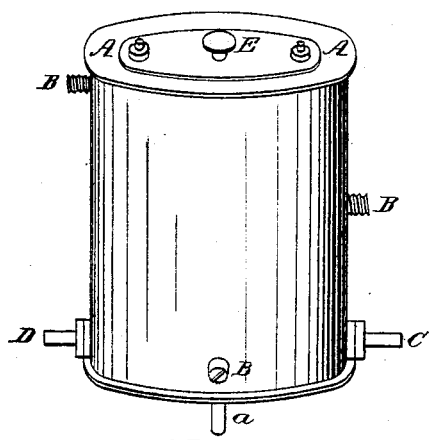
Fig. 2.
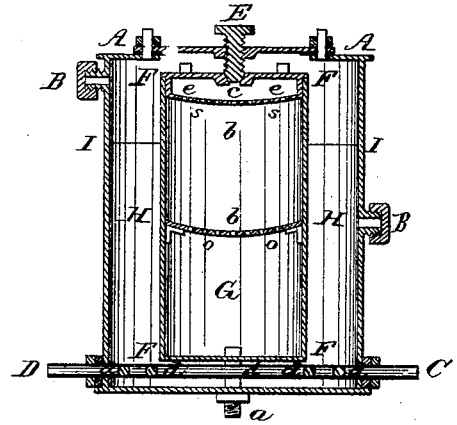
Fig. 6.
Fig. 3.
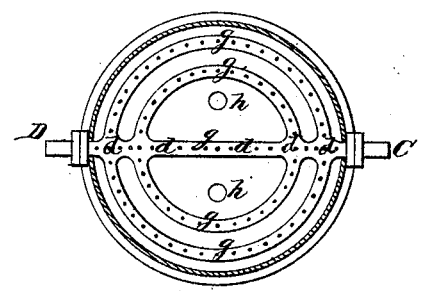
Fig. 5.
Fig. 4.
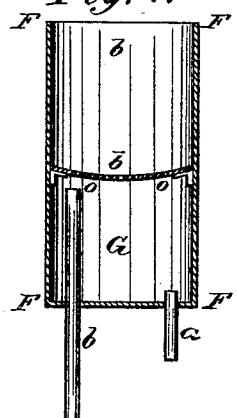
Fig. 7.
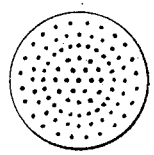
Witnesses.
Samuel Blair
George P. Royster
Inventors.
Matthew Cooke
James W. Watt

UNITED STATES PATENT OFFICE.

MATTHEW COOKE AND JAMES W. WATT, OF SACRAMENTO, CALIFORNIA.

IMPROVEMENT IN FILTERS.

Specification forming part of Letters Patent No. 132,385, dated October 22, 1872.

*To all whom it may concern:*

Be it known that we, MATTHEW COOKE and JAMES W. WATT, of the city of Sacramento and county of Sacramento, in the State of California, have jointly invented a new and Improved Apparatus for Collecting Sediments from Water; and we do hereby declare that the following is a full and exact description thereof, reference being had to the accompanying drawing and to the letters of reference marked thereon making a part of this specification.

Figure 1 is a perspective view of the apparatus; Fig. 2 is a vertical sectional view; Fig. 3 is a plan of distributing-pipes, showing the perforations (on lower side next bottom;) Fig. 4 is a vertical sectional view of inner vessel, (see F F F F, Fig. 2;) Fig. 5 is a vertical sectional view of hollow cover of inner vessel; Fig. 6 is a horizontal view of top of hollow cover; and Fig. 7 is the plan of perforation of bottom of hollow cover and bottom at o o, Figs. 2 and 4.

A A, top of apparatus, Figs. 1 and 2. B B B represent outlets where hose or pipes can be attached, if necessary, to carry off the sediments when washing the cleansing-material; C, a supply-pipe, leading the water to the perforated distributing-pipes, Figs. 1, 2, and 3; D, a connection used for cleaning sediments from distributing-pipes, and can also be used to furnish an extra supply of water, if required, for washing off sediments or any other purpose, Figs. 1, 2, and 3; E, a valve, regulating supply of water to inner vessel, Figs. 1 and 2; F F F F, sectional view of vessel No. 2, or, as here represented, inner vessel, Figs. 2 and 4. G is a receiver for the water cleaned of sediment. H H is the space in the apparatus where the sand and gravel, or crushed or ground quartz is placed, (called in this specification in some places "material,") Fig. 2. I I, lines showing about what height the material may be put in, Fig. 2; *a*, pipe for drawing water from receiver G, Figs. 2 and 4; *b b*, space filled with charcoal and sand, gravel, or ground quartz, Figs. 2 and 4; *c*, an opening, where water enters hollow cover of inner vessel, Figs. 2, 5 and 6; *d d d d d*, sectional view of distributing-pipes, Figs. 2 and 3; *e e*, sectional view of hollow cover, Figs. 2 and 4; *f*, overflow-pipe in water-receiver G, Fig. 4; *g g g g g*, plan of distributing-pipes, showing perforations, Fig. 3; *h h*, perforations in bottom of outer vessel for pipes connecting with inner vessel, Fig. 3; *o o*, perforated bottom in inner vessel, Figs. 2 and 5; *s s*, perforated bottom in hollow lid, Figs. 2 and 5.

The nature of our joint invention consists in providing a vessel, tank, or reservoir, of any form required, and by placing a series of distributing-pipes, perforated in several places, Fig. 3, on or near the bottom thereof, covered to a necessary depth with sand, gravel, or ground quartz, or any other material equivalent to the same. The distributing-pipes being at C, Figs. 1, 2, and 3, connected with a hydrant or any body of water with a sufficient elevation or pressure to force the water through the material covering the pipes in the apparatus, (or vessel provided for the purpose,) the water will pass through the perforations in the distributing-pipes, and be forced by the pressure through the sand or material in the apparatus. The water, on reaching the top of vessel, Fig. No. 1, will be forced into another vessel or vessels, one of which may, if required, be placed inside of vessel, Fig. No. 1, or at any place suitable. This vessel, being part of the apparatus, we will call No. 2, and placed inside of vessel, Fig. 1, (see F F F F, Fig. 2.) It is constructed in two divisions. One, marked G, is a receiver for the water cleaned of sediments. A perforated bottom is placed at *o o*, Figs. 2 and 4. On this bottom *o o* is placed one or more pieces of cloth or flannel. The space *b b*, Figs. 2 and 4, is filled with charcoal, and ground quartz or gravel. On or near the top of this material is also placed one or more pieces of cloth or flannel. The vessel is then closed by a hollow cover, *e e*, Figs. 2 and 5. This cover has a perforated bottom, for the purpose of spreading the water over the material in the vessel. The water is forced through an opening, *c*, Figs. 2, 5, and 6, but regulated by a valve, E, Figs. 1 and 2. (When a vessel is placed outside of the vessel, Fig. 1, the water can be regulated by a valve on the connecting-pipe.) The water passes through the material in this vessel, No. 2, either by gravitation or pressure, as may be required, to the receiver G, Figs. 2 and 4, where it can be drawn off at the pipes *a* or *f*, Figs. 1, 2, and 4. When the water is required to be forced any height above where the apparatus is placed, an attachment can be made at the top of the apparatus, and the water forced to one or more vessels constructed as F F F F, Figs. 2 and 4, when it will pass through the charcoal, gravel, &c., to the receiver G, by gravitation or pressure, as the case may require.

In order to clean out the sediments that will collect in the space H H, Fig. 2, shut the opening $c$ by the valve E, Figs. 1, 2, and 5; open one of the outlets B above the sand, &c.; let on a pressure of water through the distributing-pipes; and the sediments will be forced to the top of the sand, gravel, &c., and washed out at B, Figs. 1 and 2. The inner vessel (or vessel No. 2) can be cleaned of sediments collected by attaching a hose or pipe to $f$, Fig. 4, and forcing water through the perforated bottom over receiver G, Figs. 2 and 4.

The perforated distributing-pipes with sand, gravel, ground quartz, or charcoal, can be used in open tanks, vessels, or reservoirs, for the purpose of collecting sediments from water; also, for cleaning out sediments when collected, as heretofore described for closed vessels, &c.

We do not desire to claim as our joint invention the use of sand, gravel, ground quartz, cloth, or flannel, for collecting sediments from water.

What we claim as our joint invention, and desire to secure by Letters Patent, is—

In a water-filter, the combination and arrangement of the perforated pipes $d$ and $g$, and outer vessel with the inner vessel $b$ G, constructed as described, and a filtering material, arranged as described, as and for the purpose set forth.

MATTHEW COOKE.
JAMES WILLIAM WATT.

Witnesses:
SAMUEL BLAIR,
GEORGE PARKE ROYSTER.